US012452025B2

(12) United States Patent
Sambale

(10) Patent No.: US 12,452,025 B2
(45) Date of Patent: Oct. 21, 2025

(54) FIRST TERMINAL, METHOD FOR OPERATING THE FIRST TERMINAL, SECOND TERMINAL, AND METHOD FOR OPERATING THE SECOND TERMINAL

(71) Applicant: Robert Bosch GmbH, Stuttgart (DE)

(72) Inventor: Klaus Sambale, Oberhausen (DE)

(73) Assignee: ROBERT BOSCH GMBH, Stuttgart (DE)

(*) Notice: Subject to any disclaimer, the term of this patent is extended or adjusted under 35 U.S.C. 154(b) by 121 days.

(21) Appl. No.: 18/296,820

(22) Filed: Apr. 6, 2023

(65) Prior Publication Data

US 2023/0254098 A1 Aug. 10, 2023

Related U.S. Application Data

(63) Continuation of application No. 17/045,609, filed as application No. PCT/EP2019/061338 on May 3, 2019, now Pat. No. 11,664,955.

(30) Foreign Application Priority Data

Jun. 25, 2018 (DE) ..................... 10 2018 210 279.1

(51) Int. Cl.
*H04L 5/00* (2006.01)
*H04L 1/1607* (2023.01)
*H04W 84/00* (2009.01)

(52) U.S. Cl.
CPC .......... *H04L 5/0096* (2013.01); *H04L 1/1621* (2013.01); *H04L 5/0035* (2013.01); *H04L 5/0055* (2013.01); *H04W 84/005* (2013.01)

(58) Field of Classification Search
None
See application file for complete search history.

(56) References Cited

U.S. PATENT DOCUMENTS

2006/0268768 A1 11/2006 Harris et al.
2011/0216712 A1* 9/2011 Yang ..................... H04W 72/21 370/329

(Continued)

FOREIGN PATENT DOCUMENTS

CN 1836461 A 9/2006
CN 103684534 A 3/2014

(Continued)

OTHER PUBLICATIONS

Thomas L. Frey, Cooperative Sensor Resource Management for Improved Situation Awareness, Jun. 19-21, 2012, p. 1-7.*

(Continued)

*Primary Examiner* — Ayman A Abaza
*Assistant Examiner* — Camquyen Thai
(74) *Attorney, Agent, or Firm* — NORTON ROSE FULBRIGHT US LLP

(57) ABSTRACT

A first terminal of a radio communications network. The first terminal includes at least one processor, at least one memory with computer program code, and at least one communication module and at least one antenna. The computer program code is configured in such a way that, using the processor, the communication module, and the antenna, it causes the first terminal to send first messages on a first radio resource to a group of further terminals, to receive at least one response, after sending the particular first message, from at least one of the further terminals of the group, to ascertain a resource change decision as a function of the at least one response, and to send second messages as a function of the resource change decision on a second radio resource to the group of further terminals, the second radio resource being different from the first radio resource.

22 Claims, 6 Drawing Sheets

K
J
G
B
R1
502
N1
receive message and ascertain response
504
A1
ascertain first message and send
compare and ascertain resource change
506
R2
508
select second radio resource and send second message
N2
510
ascertain and send response
R2
A3
512
514
ascertain and send response
A2
A4

(56) References Cited

U.S. PATENT DOCUMENTS

2012/0134336 A1* 5/2012 Nakaya .................. G08G 1/094
370/329
2015/0319746 A1 11/2015 Lu et al.
2016/0155333 A1 6/2016 Strassberger et al.
2017/0141861 A1 5/2017 Zhang
2017/0264688 A1 9/2017 Sell et al.
2018/0220428 A1 8/2018 Sun et al.
2018/0249444 A1* 8/2018 Sorrentino ............ H04W 24/08
2018/0279096 A1* 9/2018 Wu ..................... H04W 72/121
2018/0317268 A1 11/2018 Kim et al.
2019/0044667 A1 2/2019 Guo et al.
2019/0239035 A1 8/2019 Chae et al.

FOREIGN PATENT DOCUMENTS

CN 107534828 A 1/2018
EP 1879403 A1 1/2008
EP 2146515 A1 1/2010
KR 20100113558 A 10/2010
WO 2013157230 A1 10/2013
WO WO-2017218003 A1 * 12/2017 ............ B60W 30/16

OTHER PUBLICATIONS

International Search Report for PCT/EP2019/061338, Issued Aug. 26, 2019.

802.11P-2010—IEEE Standard for Information Technology—Local and Metropolitan Area Networks—Specific Requirements Part 11: Wireless Lan Medium Access Control (MAC) and Physical Layer (PHY) Specifications Amendment 6: Wireless Access in Vehicular Environments, 2010, pp. 1-51.

3GPP TS 36.300 V14.2.0 (Mar. 2017), 2017, pp. 1-330.

ETSI TS 102 637-3 V1.1.1 (Sep. 2010), 2010, pp. 1-46.

ETSI TS 102 637-2 V1.2.1 (Mar. 2011), 2011, pp. 1-18.

* cited by examiner

FIRST TERMINAL, METHOD FOR OPERATING THE FIRST TERMINAL, SECOND TERMINAL, AND METHOD FOR OPERATING THE SECOND TERMINAL

RELATED APPLICATION INFORMATION

The present application is a continuation application of U.S. patent application Ser. No. 17/045,609 filed Oct. 6, 2020, which is a U.S. National Phase application of International Patent Application PCT/EP2019/061338 filed on May 3, 2019, all of which claim priority to and the benefit of German Patent Application No. 10 2018 210 279.1, which was filed in Germany on Jun. 25, 2018, the disclosures of all of which are incorporated herein by reference.

FIELD

The present invention relates to a first terminal, a method for operating the first terminal, a second terminal, and a method for operating the second terminal.

SUMMARY

An object of the present invention may be achieved by a first terminal, by a method for operating the first terminal, by a second terminal, and by a method for operating the second terminal, an accordance with example embodiments of the present invention.

According to a first aspect of present invention, a first terminal of a radio communications network is provided. In accordance with an example embodiment of the present invention, the first terminal includes at least one processor, at least one memory with computer program code, and at least one communication module and at least one antenna, the computer program code being configured in such a way that, using the at least one processor, the at least one communication module, and the antenna, it causes the first terminal to send first messages on a first radio resource to a group of further terminals, to receive at least one response, after sending the particular first message, from at least one of the further terminals of the group, to ascertain a resource change decision as a function of the at least one response, and to send second messages as a function of the resource change decision on a second radio resource to the group of further terminals, the second radio resource being different from the first radio resource.

For the first terminal, it is possible, based on the received responses, to decide whether the radio resource that is utilized for a broadcast message or multicast message, and that has been assigned continuously or semicontinuously, is maintained or changed. Due to making the resource change decision, the first terminal changes to the second radio resource, thus primarily avoiding consecutive collisions and ensuring as quickly as possible a high receipt rate of the sent messages. A response to occurring collisions is thus made rapidly, and at the same time a distributed collision avoidance strategy is provided which manages without a central scheduling unit such as a base station.

Applications in which the loss of individual messages is acceptable, but the loss of multiple successive messages is problematic, benefit from the provided decentralized collision avoidance strategy. One example of such applications is so-called platooning, in which, for example, trucks traveling in a line communicate with one another and coordinate acceleration and braking operations with one another.

One advantageous specific embodiment is characterized in that the first terminal receives a first number of responses after sending the particular message, ascertains a second number of terminals of the group, compares the first number of responses to the second number of terminals in the group, and ascertains the resource change decision based on the comparison. When responses cease, i.e., there is a reduction, in the sense of receipt acknowledgments, in the first number in comparison to the second number of group-associated terminals, the first terminal assumes, for example, an increased collision rate and changes the radio resource used in order to mitigate this situation. The number of terminals of the group is advantageously utilized to improve the collision response by the first terminal in the sense of the resource change decision, and thus to improve the spectral efficiency.

In accordance with one advantageous specific embodiment of the present invention, the first terminal receives a first number of responses after sending the particular message, ascertains a second number of terminals of the group, ascertains a third number by multiplying the first number by a scaling factor, compares the third number to the second number of terminals of the group, and ascertains the resource change decision based on the comparison. It is advantageous that only one subset of the terminals of the group sends a response. This number is determined by the scaling factor. Based on the number of received responses and the scaling factor, the first terminal then computes the number of terminals that would acknowledge a receipt/nonreceipt. The number of sent responses decreases due to the scaling factor, as the result of which the spectral efficiency in the provided collision avoidance strategy increases.

In accordance with one advantageous specific embodiment of the present invention, the response is a negative receipt acknowledgment. The advantage of the negative receipt acknowledgment is that, when it is assumed that a large number of the involved terminals correctly receives the sent messages, a smaller number of terminals sends a response to the message. The smaller portion of the terminals that confirm the nonreceipt with the negative receipt acknowledgment then generate a smaller data volume on the radio channel, which increases the spectral efficiency.

In accordance with one advantageous specific embodiment of the present invention, the response includes a resource indicator that uniquely identifies the radio resource in question. The resource indicator may thus include, for example, a time stamp or an identifier of the first radio resource. The resource indicator thus allows the first terminal to make an unambiguous, simple association of the received response with the radio resource, as the result of which the ascertainment of the resource change decision is simplified. The collision recognition is improved.

In accordance with one advantageous specific embodiment of the present invention, the first terminal receives positive receipt acknowledgments as a response to the particular sent message, receives negative receipt acknowledgments as a response to the particular sent message, ascertains a collision indicator as a function of the number of positive receipt acknowledgments and as a function of the number of negative receipt acknowledgments, and ascertains the resource change decision based on the comparison of the collision indicator to a collision threshold value. The collision indicator advantageously provides reliable information concerning the penetration rate of the sent message in the group of further terminals. The recognition accuracy of collisions increases, thus also improving the corrective measures in the sense of the change of the radio resource.

In accordance with one advantageous specific embodiment of the present invention, the first terminal receives at least one piece of movement and/or position information from terminals with the aid of a further message, ascertains the group of further terminals as a function of the received movement and/or position information, and ascertains the resource change decision as a function of responses of the terminals of the ascertained group. By taking into account the movement and/or position information, only those further terminals of the group, in the sense of a subset of the terminals that are directly accessible via radio, which also actually utilize same are advantageously considered when changing a radio resource. The further terminals, which potentially undergo collisions only briefly, are advantageously masked when ascertaining the resource change decision.

For example, vehicles traveling on an expressway in the opposite lane benefit less from a change of the radio resource than vehicles that have the same travel direction. As a result, the movement information in the sense of a travel direction offers advantages in making the resource change decision.

Likewise, further terminals situated a long distance away may be ignored, thus increasing the relevance of the further terminals, situated closer to the first terminal, in the resource change decision. In addition, the repeat interval of the utilized radio resource may be shortened for sending messages, since only collisions for a subgroup of the further terminals are now to be monitored and resolved.

In accordance with one advantageous specific embodiment of the present invention, the first terminal ascertains the scaling factor as a function of the number of further terminals of the group. By taking into account the number of terminals in the group, the scaling factor advantageously considers the scaling network load with the number of terminals. As a result, the number of responses may be set to be inversely proportional to the network load with the aid of the scaling factor, so that the distributed collision avoidance strategy is maintained even under increased load on the radio channel. It is thus possible for the first terminal to decide, based on the received responses, whether the utilized radio resource is maintained or changed. At the same time, the decentralized collision recognition and resolution may be utilized even under increasing network load.

In accordance with one advantageous specific embodiment of the present invention, the first terminal receives a first number of responses, after sending the particular message that is sent on the first radio resource, from terminals of the group, receives a second number of responses, after sending the particular message that is sent on the second radio resource, from terminals of the group, ascertains a further resource change decision when an absolute difference of the first and second number of responses exceeds a threshold value, and sends, as a function of the resource change decision, further messages on a third radio resource to the group of further terminals, the third radio resource being different from the first and second radio resources. An option is thus provided that the first terminal triggers a new change of the radio resource immediately upon a change of the radio resource and the receipt of responses. Thus, a radio resource having preferably few collisions is found as quickly as possible in a decentralized manner.

In accordance with one advantageous specific embodiment of the present invention, the messages, in particular the first, second, and third messages, as well as the further message, are Cooperative Awareness Messages (CAM), in particular according to ETSI TS 102 637-2 V1.2.1 (2011-03), and/or Decentralized Environmental Notification Messages (DENM), in particular according to ETSI TS 102 637-3 V1.1.1 (2010-09).

A second aspect of the present invention provides a method for operating a first terminal of a radio communications network. In accordance with an example embodiment of the present invention, the method includes: sending first messages on a first radio resource to a group of further terminals, receiving at least one response, after sending the particular first message, from at least one of the further terminals of the group, ascertaining a resource change decision as a function of the at least one response, and sending second messages, as a function of the resource change decision, on a second radio resource to the group of further terminals, the second radio resource being different from the first radio resource.

A third aspect of the present invention relates to a second terminal of a radio communications network. In accordance with an example embodiment of the present invention, the second terminal includes at least one processor, at least one memory with computer program code, and at least one communication module and at least one antenna, the computer program code being configured in such a way that, using the at least one processor, the at least one communication module, and the antenna, it causes the second terminal to receive first messages from a first terminal on a first radio resource, to ascertain a response as a function of a successful or unsuccessful decoding of the particular first message, to send the response to the first terminal, and to receive second messages from the first terminal on a second radio resource, the second radio resource being different from the first radio resource.

In accordance with one advantageous specific embodiment of the present invention, the second terminal ascertains a random number between two values, compares the random number to a threshold value, and sends the response to the first terminal based on the comparison.

In accordance with one advantageous specific embodiment of the present invention, the second terminal sends the response to the first terminal only when the ascertained random number is less than or equal to the threshold value, the threshold value being a reciprocal value of a scaling factor.

In accordance with one advantageous specific embodiment, the second terminal receives at least one piece of movement and/or position information from further terminals with the aid of a further message, and ascertains the scaling factor as a function of the number of further terminals. By taking into account the number of terminals, the scaling factor advantageously considers the scaling network load with the number of terminals. As a result, the number of responses may be set to be inversely proportional to the network load with the aid of the scaling factor, so that the distributed collision recognition and avoidance strategy is maintained even under increased load on the radio channel. It is thus possible for the first terminal to decide, based on the received responses, whether the utilized radio resource is maintained or changed. At the same time, the decentralized collision recognition and resolution may be utilized even under increasing network load.

In accordance with one advantageous specific embodiment, a reception power is ascertained during the receipt of the first message, and the response is ascertained as a function of the reception power and as a function of the successful or unsuccessful decoding of the particular first message. The range of the sending of the first message is thus advantageously taken into account in ascertaining the response.

In accordance with one advantageous specific embodiment of the present invention, the response is a negative receipt acknowledgment. The advantage of the negative receipt acknowledgment is that when it is assumed that a large number of the involved terminals correctly receives the sent messages, a smaller number of terminals sends a response to the message. The smaller portion of the terminals that confirm the nonreceipt with the negative receipt acknowledgment then generate a smaller data volume on the radio channel, which increases the spectral efficiency.

In accordance with one advantageous specific embodiment of the present invention, the response includes a resource indicator that uniquely identifies the radio resource in question. The resource indicator may thus include, for example, a time stamp or an identifier of the first radio resource. The resource indicator thus allows the first terminal to make an unambiguous and simple association of the received responses, thus simplifying the ascertainment of the resource change decision. Computing time is saved, and at the same time the collision recognition is improved.

In accordance with one advantageous specific embodiment of the present invention, the messages, in particular the first and second messages as well as the further message, are Cooperative Awareness Messages (CAM), in particular according to ETSI TS 102 637-2 V1.2.1 (2011-03), and/or Decentralized Environmental Notification Messages (DENM), in particular according to ETSI TS 102 637-3 V1.1.1 (2010-09).

A fourth aspect of the present invention relates to a method for operating a second terminal of a radio communications network. In accordance with an example embodiment of the present invention, the method includes: receiving first messages from a first terminal on a first radio resource, ascertaining a response as a function of a successful or unsuccessful decoding of the particular first message, sending the response to the first terminal, and receiving second messages from the first terminal on a second radio resource, the second radio resource being different from the first radio resource.

Further features and advantages are apparent from the following description of exemplary embodiments and the figures.

DETAILED DESCRIPTION OF EXAMPLE EMBODIMENTS

Figure 1:
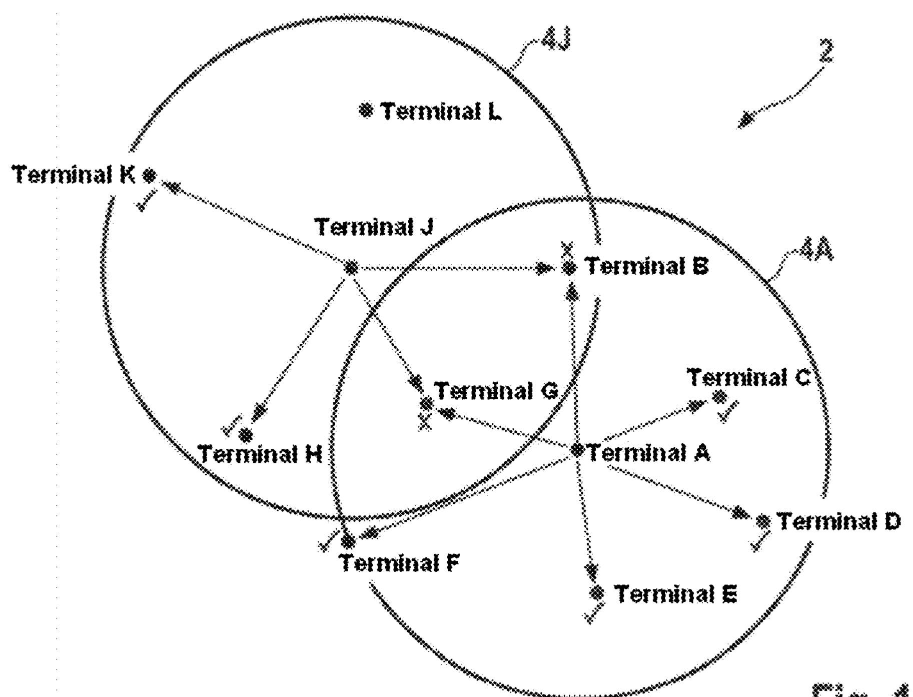
FIG. 1 shows a schematically illustrated radio communications network in accordance with an example embodiment of the present invention.

FIG. 1 shows a schematic illustration of a radio communications network 2. Terminals A through L are situated on/in a particular vehicle or a roadside infrastructure, for example. Terminals A through L are configured, for example, according to the IEEE standard "802.11 p-2010—IEEE Standard for Information Technology—Local and Metropolitan Area Networks—Specific Part 11: Wireless LAN Medium Access Control (MAC) and Physical Layer (PHY) Specifications Amendment 6: Wireless Access in Vehicular Environments," which is incorporated by reference. IEEE 802.11p is a standard for expanding the IEEE 802.11 WLAN standard. The objective of IEEE 802.11p is to establish radio technology in passenger vehicles and provide a reliable interface for Intelligent Transport Systems (ITSs) applications. IEEE 802.11p is also the basis for Dedicated Short Range Communication (DSRC) in the range of 5.85 to 5.925 GHz. In another example, terminals A through L are configured according to the LTE-V2X standard, in particular according to 3GPP TS 36.300 V14.2.0 (2017-03), in which terminals A through L communicate directly with one another via a sidelink channel. In radio communications network 2, data that are not specified or scheduled by a central unit are transmitted between terminals A through L via a radio resource. In the example shown, terminals A and J use this radio resource to send messages to a particular group of terminals. Terminal A sends its message to the group of terminals B, C, D, E, F, and G, which are situated within a radio distance 4A of terminal A. Terminal J sends its message to the group of terminals B, G, H, and K, but not to terminal L, all of which are situated within a radio distance 4J of terminal J. As a result, either all or a subset of the directly accessible terminals are addressed with the sent messages in the sense of a broadcast or multicast. Terminals B and G are each situated within both radio distances 4A and 4J, and are also part of the respective groups addressed by the messages. Simultaneous sending of messages results in a collision at terminals B and G.

Figure 2:
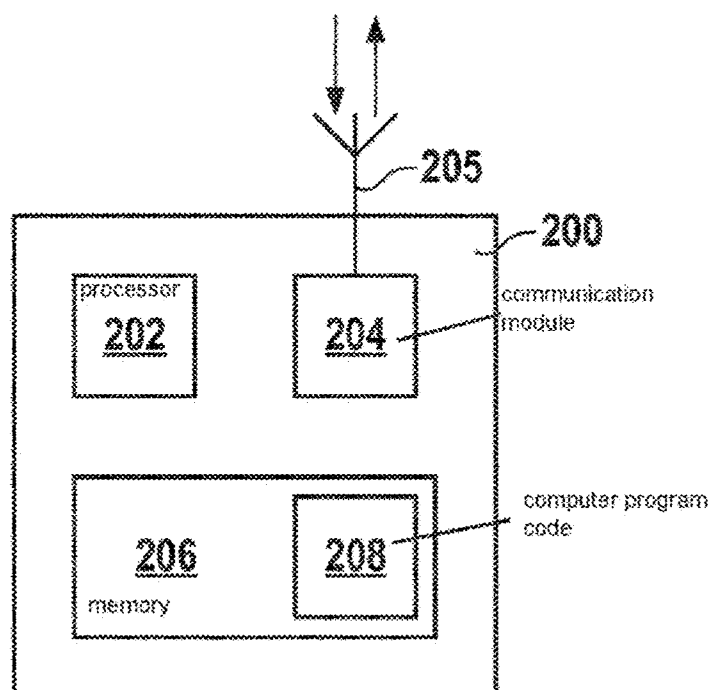
FIG. 2 shows a schematically illustrated terminal in accordance with an example embodiment of the present invention.

FIG. 2 schematically shows a terminal 200. Terminal 200 includes a processor 202, a communication module 204, an antenna 205, and a memory 206. Memory 206 is provided with a computer program code 208 that is configured in such a way that, using the at least one processor 202, the at least one communication module 204, and the at least one antenna 205, it carries out the steps described in the present specification. Terminals A through L from FIG. 1 are designed according to terminal 200, for example.

Figure 3:
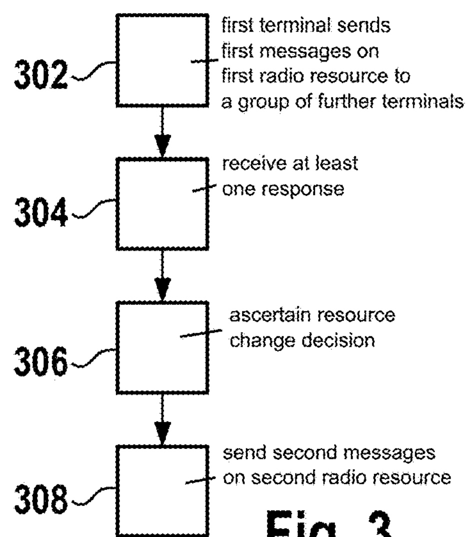
FIGS. 3, 4, 8, and 11 each show a schematically illustrated flow chart in accordance with example embodiments of the present invention.

FIG. 3 shows a schematic flow chart for operating a first terminal A, J from FIG. 1. The first terminal sends first messages on a first radio resource to a group of further terminals according to a step 302. The first terminal receives at least one response, after sending the particular first message, from at least one of the further terminals of the group according to a step 304. The first terminal ascertains a resource change decision as a function of the at least one response according to a step 306. The first terminal sends second messages, as a function of the resource change decision, on a second radio resource to the group of further terminals according to a step 308.

The first and the second radio resource are, for example, scheduled independently by each terminal A, J, resulting in distributed scheduling, with no central unit determining the allocation of the radio resources. The first radio resource is used during a first time period. The second radio resource is used during a second time period. The radio resources are thus scheduled in a decentralized manner, semicontinuously or continuously.

A particular one of the radio resources used is characterized by a periodically recurring use of at least one time-frequency resource, which may also be referred to as a resource block. Different radio resources differ, for example, by a different periodicity and/or by a distance of the particular time-frequency resource used, and/or by a subchannel used, and/or a modulation and coding scheme (MCS).

In accordance with one example, the first terminal monitors available radio resources. The first terminal counts changes of radio resources by further terminals, the changes being carried out, for example, by the respective other terminal based on one of the described methods. As soon as the number of changes per unit time exceeds a threshold value, the first terminal will refrain from changing the radio resource, even though it has ascertained a resource change decision. This results in advantages under high channel load, since the likelihood of collisions increases due to too frequent changes of the radio resources.

Figure 4:
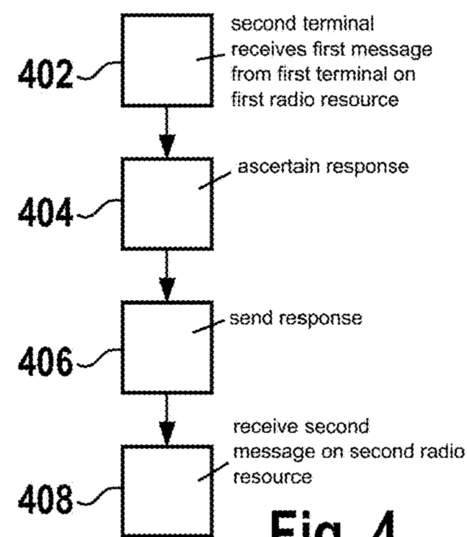

FIG. 4 shows a schematic flow chart for operating a second terminal C, D, E, B, G, F, H, K from FIG. 1. The second terminal receives first messages from a first terminal on the first radio resource according to a step 402. The second terminal ascertains a response as a function of a successful or unsuccessful decoding of the particular first message according to a step 404. The second terminal sends the response to the first terminal according to a step 406. The second terminal receives second messages from the first terminal on the second radio resource according to a step 408. The first and second radio resources are characterized, for example, by a respectively associated time-frequency resource that is periodically utilized in each case.

The first and second radio resources used are either negotiated among the terminals or determined by an individual terminal itself. A further central unit such as a base station is not present, so that the communication between the terminals is coordinated by the terminals themselves.

Figure 5:
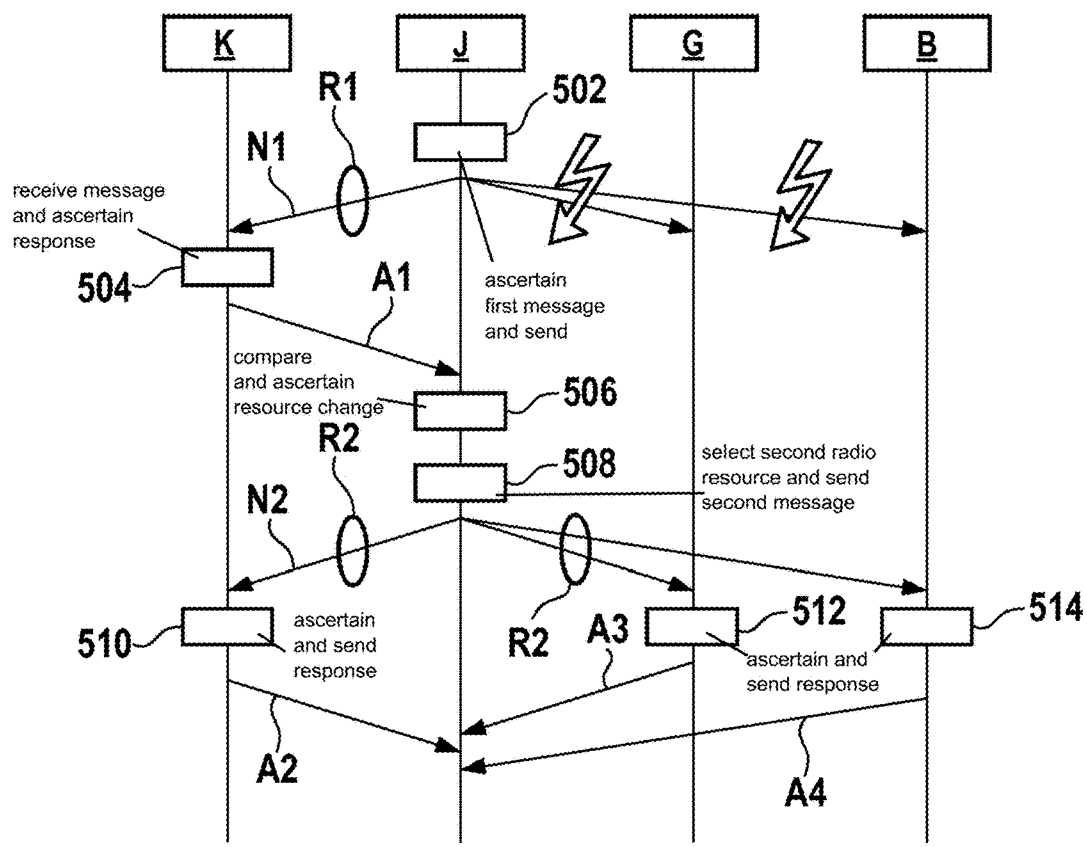
FIGS. 5, 6, 7, 9, 10, and 12 each show a schematically illustrated sequence diagram in accordance with example embodiments of the present invention.

FIG. 5 shows a schematic sequence diagram. Terminal J ascertains a first message N1 in step 502 and sends it via a first radio resource R1 in particular to terminals K, G, and B. Terminals G and B do not receive first message N1, or are not able to successfully decode it. In contrast, terminal K receives message N1 and ascertains a response A1 in the sense of a successful receipt acknowledgment in step 504 in order to forward the message to terminal J. If it is assumed in the example in FIG. 5 that terminals K, G, and B belong to the group of terminals that are addressed by message N1, the number of three terminals and the first number of a single response are compared to one another by terminal J in a step 506. The number may also include zero responses. Thus, it is determined in step 506 that a number of three terminals K, G, B should have received message N1, but only one of the terminals, namely, terminal K, has actually received the message. Thus, terminal J may assume in step 506 that the collisions have taken place upon receipt of message N1 at terminals G and B. As a result, the resource change decision is ascertained based on the comparison carried out in step 506. In a step 508, the resource change decision results in a second radio resource R2 that is different from first radio resource R1 being selected for a second message N2, in order to send second message N2 via the second radio resource to terminals K, G, B. A response A2, A3, A4 is ascertained in a respective step 510, 512, 514 and subsequently forwarded to terminal J. The number of terminals belonging to the group is ascertained by terminal J as a function of received position messages, for example, and entered into a corresponding list. In FIG. 5, for example only positive receipt acknowledgments ACKs are sent.

The particular responses A1, A2, etc., may be transmitted either as separate messages or packaged in another message. This applies for the entire present description. The particular responses A1, A2, etc., include at least one of the following pieces of information: positive receipt acknowledgment or negative receipt acknowledgment; sender of the message for which the particular response A1, A2 is ascertained and sent; a time stamp that identifies a point in time of receiving the associated message; an identification of the radio resources used for the message.

Figure 6:
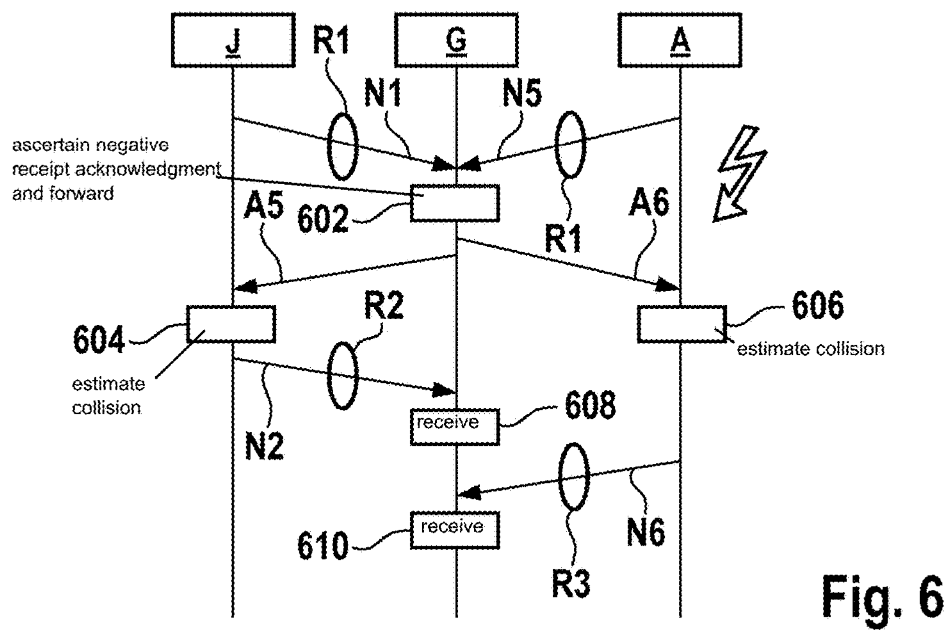

FIG. 6 shows a schematic sequence diagram. The two terminals J and A attempt to transmit a respective message N1, N5 on resource R1 to terminal G at the same point in time. Terminal G ascertains a respective negative receipt acknowledgment A5, A6 in a step 602 and forwards this negative receipt acknowledgment A5, A6 to respective terminal J, A. Of course, it is also possible for only a single negative receipt acknowledgment to be sent, which is indicated by terminals J, A or the radio resource used.

The particular terminal J, A estimates in a respective step 604, 606, based on respective response A5, A6, that a collision has taken place during the transmission of messages N1, N5. Accordingly, the resource change decision is made in step 604, 606 to send subsequent messages N2, N6 on a respective radio resource R2, R3 that is different from first radio resource R1. Radio resources R3, R2 differ, for example, in that a different phase is selected, as the result of which the sending of messages is carried out offset relative to one another. Radio resources R2, R3 are randomly selected, for example, in steps 604, 606. It is also possible for the selection of radio resources R2, R3 to be carried out according to a predetermined scheme in order to avoid a new collision or to reduce the risk of collision. The particular messages N2, N6 are successfully received in steps 608 and 610, respectively. In this example, the successful receipt is not reported to terminals J and A; rather, only an unsuccessful receipt is responded to in the sense of a negative receipt acknowledgment, with the aid of responses A5, A6.

Figure 7:
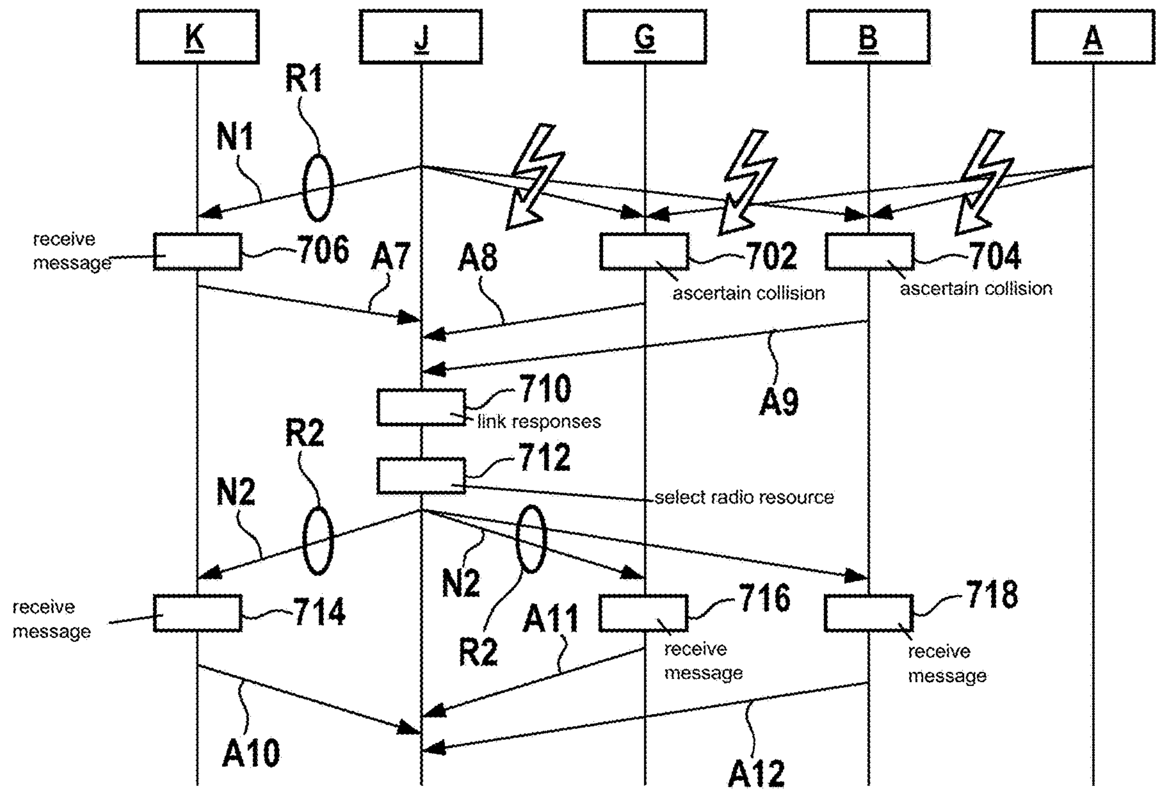

FIG. 7 shows a schematic sequence diagram. In the example shown, only terminal K receives a message N1, with the aid of radio resource R1, from node J, which the node ascertains in a step 706. Terminals G and B ascertain in steps 702 and 704, respectively, a collision of the data transmission of message N1 on radio resource R1 with a data transmission starting from node A. Terminal J receives corresponding responses A7, A8, and A9, response A7 being a positive receipt acknowledgment and responses A8 and A9 being negative receipt acknowledgments. Received responses A7, A8, and A9 are linked together in a step 710 in order to ascertain the resource change decision. Radio resource R2 is selected in step 712 as a function of the resource change decision in order to transmit message N2 to terminals K, G, B. Message N2 is successfully received in respective step 714, 716, 718 in order to subsequently transmit to terminal J corresponding to a particular response A10, A11, A12 in the sense of a negative receipt acknowledgment.

Figure 8:
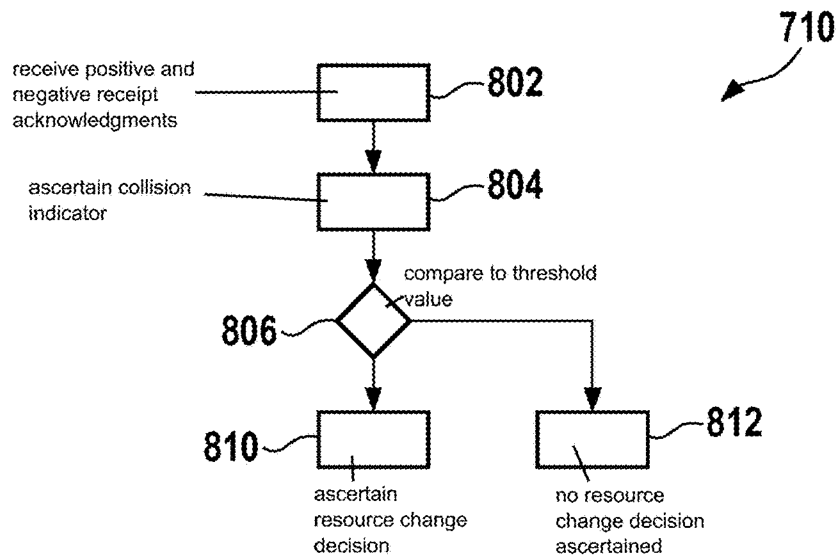

FIG. 8 shows a schematic flow chart of step 710 from FIG. 7. Positive receipt acknowledgments as well as negative receipt acknowledgments are received in a step 802 as a response to a particular sent message. A collision indicator is ascertained in a step 804 as a function of the number of positive receipt acknowledgments and as a function of the number of negative receipt acknowledgment. For example, the number of positive receipt acknowledgments may be divided by the number of negative receipt acknowledgments. Alternatively, a relative collision indicator is formed by dividing the number of positive receipt acknowledgments by the sum of the number of positive receipt acknowledgments and the number of negative receipt acknowledgments. The collision indicator is compared to a collision threshold value in a step 806. If the collision indicator in one example is a ratio of positive to negative receipt acknowledgments, the resource change decision is ascertained in a step 810 when the ratio is below the collision threshold value of 1, for example, which means that more than half of the addressed terminals have not successfully received the messages. However, if the collision indicator is above or at the collision threshold value, no resource change decision is ascertained in a step 812 in order to maintain selected first radio resource R1.

Figure 9:
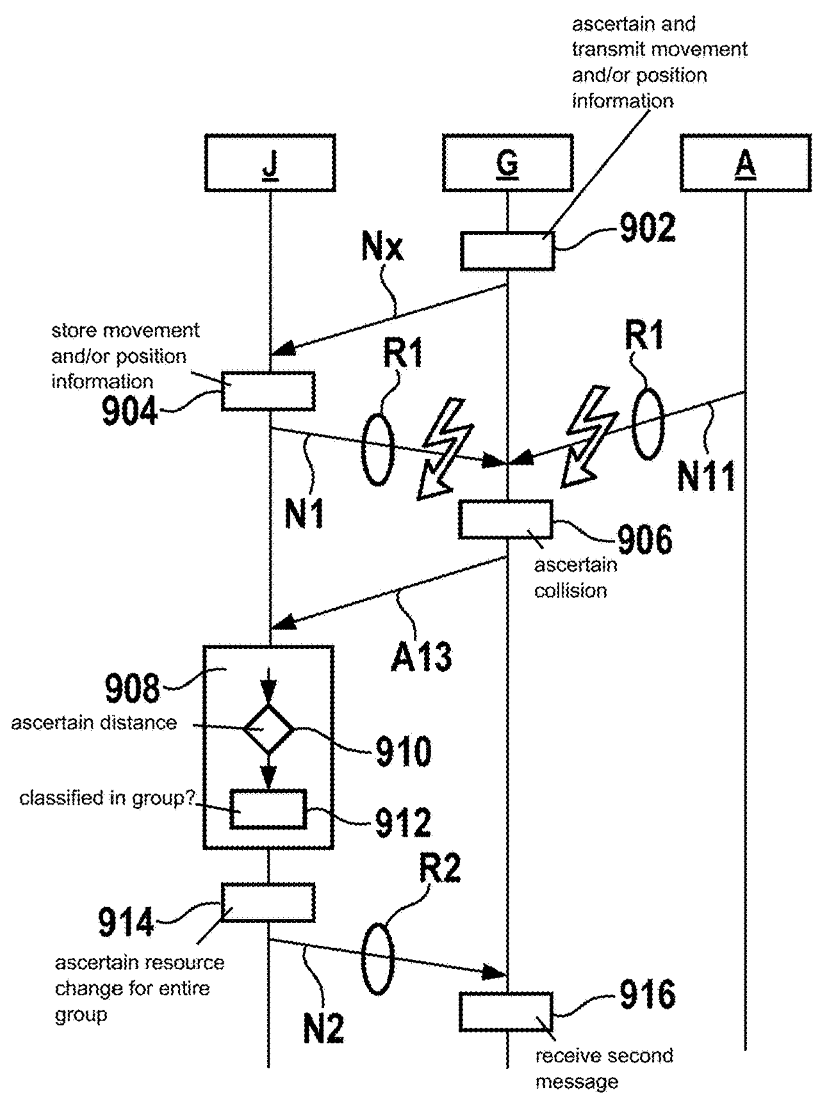

FIG. 9 shows a schematic sequence diagram. Terminal G ascertains its movement and/or position information in a step 902 and transmits same to terminal J with the aid of a further message Nx. Terminal J stores the movement and/or position information of terminal G in a step 904. Messages N1 and N11, which originate from a different terminal J, A, respectively, but are transmitted on same radio resources R1, collide, which terminal G ascertains in a step 906. The registered collision of message N1 with message N11 is transmitted to terminal J in the form of a response A13 as a report on message N1.

Upon receipt of response A13, terminal J carries out a step 908 that includes steps 910 and 912. A distance between terminals J and G is ascertained in step 910 as a function of movement and/or position information of terminals J and G. Alternatively or additionally, an identical or similar movement direction of the two terminals J and G is ascertained. A group of further terminals that includes terminal G is ascertained by comparing the distance, using a distance threshold value, and/or by taking the movement directions of terminals J and G into account. These further terminals are situated, for example, within a radius around terminal J according to the distance threshold value, and/or have the identical or similar movement direction as terminal J.

If terminal G is classified in step 912 in the group at which message N1 was determined, the resource change decisions are ascertained for the entire group of terminals and thus also for terminal G in step 914 in order to transmit second message N2 on a second radio resource R2 that is different from the first radio resource. Terminal G successfully receives second message N2 in step 916.

Figure 10:
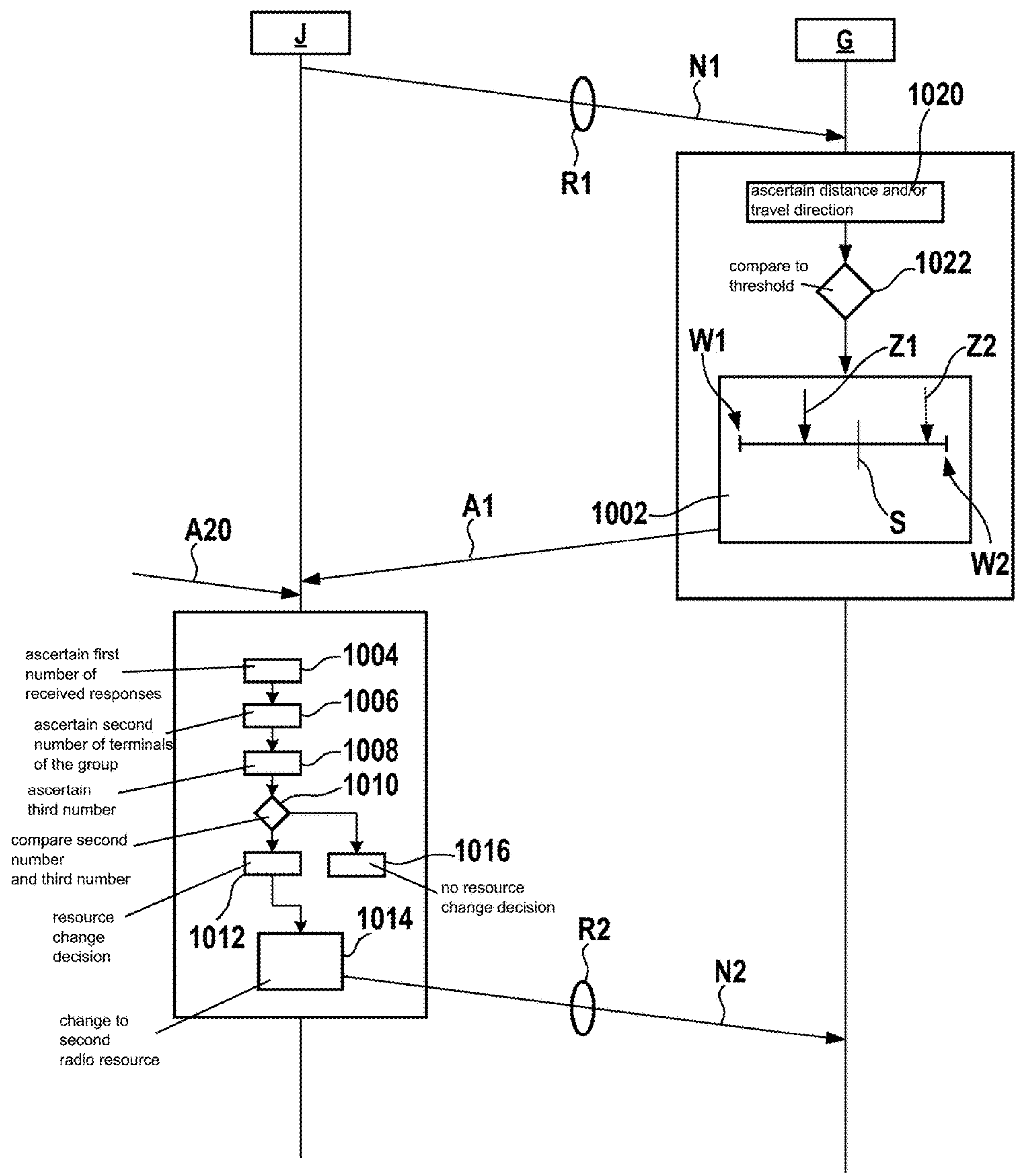

FIG. 10 shows a schematic sequence diagram. Terminal J sends message N1 on first radio resource R1. The distance and/or travel direction in relation to terminal J are/is ascertained in a step 1020. The distance and/or travel direction are/is compared to an associated threshold value in a step 1022. Based on the comparison, a switch is made to a step 1002. As a result, if terminal J is too far from terminal G or if terminal J has an opposite movement direction to that of terminal G, no response A1 is transmitted to terminal J.

Response A1 is randomly ascertained by terminal G, so that only a number of terminals G receiving message N1 ascertains a respective response A1, A20. Terminal G ascertains a random number Z1, Z2 between two predefined fixed values W1, W2 in step 1002. Ascertained random number Z1, Z2 is compared to a threshold value S. If random number Z1 is less than threshold value S, message A1 is sent. In contrast, if random number Z2 is greater than or equal to threshold value S, sending of message A1 does not take place. The threshold value is, for example, a reciprocal value of the scaling factor described below, which is ascertained, for example, as a function of the number of terminals of a group. Of course, the scaling factor may also be set to a fixed value. Responses A1, A20 may be positive or also negative receipt acknowledgments.

If responses A1, A20 are each a negative receipt acknowledgment, steps 1020 and 1022 may be omitted. In the event of a collision upon receipt of message N1 and with a sufficient SINR, terminal G successfully decodes message N1. Based on the ratio of the measured power to energy, terminal G determines a high probability of a message collision, i.e., a simultaneous transmission of data on radio resource R1. As a result, a second message could not be decoded. In this case, terminal G sends a negative receipt acknowledgment to the terminal whose message could be decoded. To prevent future collisions, terminal G carries out steps 1020 and 1022 in the event that interferences of further terminals on same radio resource R1 increase.

Terminal J receives responses A1 and A20, and ascertains a first number of received responses A1, A20 in a step 1004 after message N1 is sent. A second number of terminals of the group is ascertained in a step 1006, with the aim that the terminals of the group have received message N1. A third number is ascertained in a step 1008 by multiplying the first number by the scaling factor, so that the number of terminals is estimated that would have sent a response similar to responses A1, A20, but did not carry this out due to step 1002.

The third number and the second number are compared to one another in a step 1010. In the case of negative receipt acknowledgments, if a quotient that results from dividing the third number by the second number is above a threshold value, the resource change decision is ascertained in a step 1012 in order to change from previously used radio resource R1 to second radio resource R2 in a step 1014. However, if the above-mentioned quotient in the case of negative receipt acknowledgments is below the threshold value, no resource change decision is ascertained in a step 1016, and terminal J continues to use radio resource R1.

In another example, if in the case of positive receipt acknowledgments the quotient ascertained as in the preceding paragraph is below a threshold value, the resource change decision is ascertained. If the quotient is above the threshold value, terminal J continues to use radio resource R1.

Figure 11:
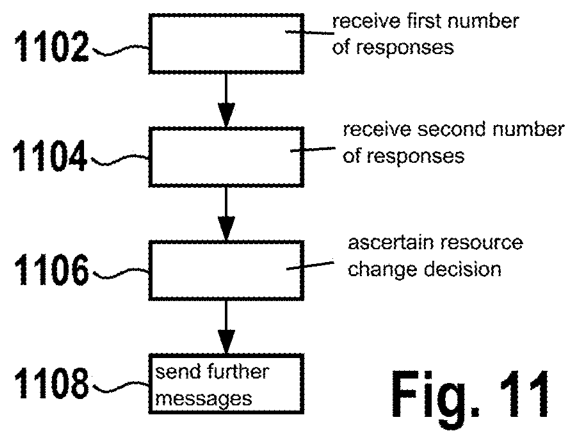
Figure 12:
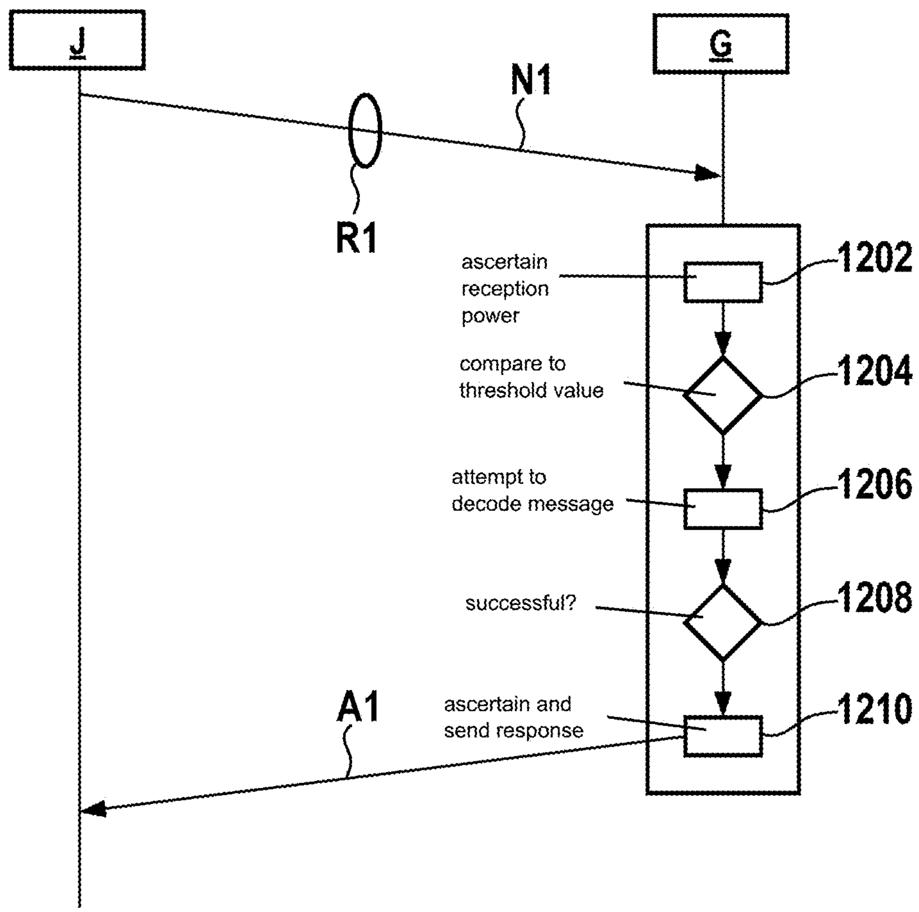

FIG. 11 shows a schematic flow chart. A first number of responses after sending the particular message that is sent on the first radio resource is received by terminals of the group in a step 1102. A second number of responses after sending the particular message that is sent on the second radio resource is received by terminals of the group in a step 1104. A further resource change decision is ascertained in a step 1106 when the absolute difference of the first and second number of responses exceeds a threshold value. Further messages are sent, as a function of the resource change decision, on a third radio resource to the group of further terminals in a step 1108, the third radio resource being different from the first and second radio resources. Thus, if it is recognized that the second radio resource is severely affected by collisions, a switch to the third radio resource is immediately made. This switch between the radio resources results in a rapid reduction in collisions. FIG. 12 shows a schematic sequence diagram. Terminal G ascertains a reception power in a step 1202. Of course, as an alternative to the reception power, some other variable such as the received energy, i.e., the received power integrated over time, may be compared to a corresponding threshold value in step 1204. A check is made in a step 1204 whether the reception power is above a threshold value, i.e., whether the reception power was sufficiently high upon receipt of message N1. If this is the case, terminal G attempts to decode message N1 in a step 1206. If it is determined in a step 1208 that the decoding was successful, response A1 to the receipt of message N1 is ascertained and sent in a step 1210. As a result, response A1 is ascertained as a function of the reception power and as a function of the successful or unsuccessful decoding of particular first message N1.

Evaluating the reception power is not used just for taking the range of the first message into account in the response. Rather, this additional parameter allows a distinction to be made at all between a collision and a signal-to-interference-plus-noise ratio (SINR) that is too low for successful decoding, and that is due to natural background noise, for example. Without evaluating the reception power, second terminals that do not successfully decode the message of the first terminal due solely to background noise may send corresponding negative responses, for example, although no "conventional" collision has occurred. Depending on the nature of the receiver of the first terminal or the transmission parameters of the message, the first terminal may then correctly receive the negative response and change to a second radio resource, with the second radio resource also providing no improvement in the transmission quality, for example due to the fact that background noise has the same effect on all radio resources. The first terminal would thus change the radio resources continuously, thus nullifying the basic advantages of the lower likelihood of collisions for (semi)continuous scheduling, which would be counterproductive.

What is claimed is:

1. A first terminal of a radio communications network, the first terminal comprising:

at least one processor;

at least one memory with computer program code;

at least one communication module; and at least one antenna;

wherein:

the computer program code is configured in such a way that, using the at least one processor, the at least one communication module, and the at least one antenna, the computer program code causes the first terminal to:

send first messages on a first radio resource to a group of further terminals situated within a radio reception distance from the first terminal;

receive at least one response, after sending the first messages, from at least one of the further terminals of the group, the at least one response being a negative receipt acknowledgment, including a resource indicator that uniquely identifies the first radio resource, and being formed based upon an effective transmission range of the first terminal, which is within the radio reception distance;

ascertain a resource change decision as a function of the at least one response; and send second messages as a function of the resource change decision on a second radio resource to the group of further terminals, the second radio resource being different from the first radio resource.

2. The first terminal as recited in claim 1, wherein the first terminal is configured to:

receive a first number of responses after sending the first messages;

ascertain a second number of terminals in the group;

compare the first number of responses to the second number of terminals in the group; and ascertain the resource change decision based on the comparison.

3. The first terminal as recited in claim 1, wherein the first terminal is configured to:

receive a first number of responses after sending the first messages;

ascertain a second number of terminals of the group;

ascertain a third number by multiplying the first number by a scaling factor;

compare the third number to the second number of terminals of the group; and ascertain the resource change decision based on the comparison.

4. The first terminal as recited in claim 3, wherein the first terminal is configured to ascertain the scaling factor as a function of a number of further terminals of the group.

5. The first terminal as recited in claim 1, wherein the first terminal is configured to:

receive positive receipt acknowledgments as a response to at least one of the sent first messages;

ascertain a collision indicator as a function of a number of the positive receipt acknowledgments and as a function of a number of the negative receipt acknowledgments; and ascertain the resource change decision based on a comparison of the collision indicator to a collision threshold value.

6. The first terminal as recited in claim 1, wherein the first terminal is configured to:

receive, from terminals using a further message, (a) at least one piece of movement information and/or (b) at least one piece of position information;

ascertain the group of further terminals as a function of the received movement and/or position information; and ascertain the resource change decision as a function of responses of the terminals of the ascertained group.

7. The first terminal as recited in claim 1, wherein the first terminal is configured to:

receive a first number of responses, after sending the first messages on the first radio resource, from terminals of the group;

receive a second number of responses, after sending the second messages on the second radio resource, from terminals of the group;

ascertain a further resource change decision when an absolute difference of the first number of responses and second number of responses exceeds a threshold value; and send, as a function of the further resource change decision, further messages on a third radio resource to the group of further terminals, the third radio resource being different from the first radio resource and the second radio resource.

8. The first terminal as recited in claim 1, wherein the first messages and the second messages include:

(a) Cooperative Awareness Messages (CAM) according to ETSI TS 102 637-2 V1.2.1 (2011-03); and/or (b) Decentralized Environmental Notification Messages (DENM) according to ETSI TS 102 637-3 V1.1.1 (2010-09).

9. The first terminal as recited in claim 1, wherein the first terminal is configured to, in response to receipt of respective ones of the at least one response:

determine respective distances between the first terminal and the respective further terminals from which the respective responses have been received; and ascertain a grouping of two or more of the further terminals based on the determined distances.

10. The first terminal as recited in claim 9, wherein the grouping is based on a comparison of the respective distances to a threshold distance.

11. The first terminal as recited in claim 1, wherein the first terminal is configured to, in response to receipt of respective ones of the at least one response:

determine respective movement directions of the respective further terminals from which the respective responses have been received; and ascertain a grouping of two or more of the further terminals based on the determined movement directions.

12. The first terminal as recited in claim 1, wherein content of the at least one response is dependent upon a determined relationship of respective ones of the further terminals to the effective transmission range of the first terminal.

13. The first terminal as recited in claim 12, wherein the determined relationship is a reflection of reception power at which the first messages were received by the further terminals.

14. The first terminal as recited in claim 12, wherein the determined relationship is a reflection of a successfulness of decoding the first messages.

15. A method for operating a first terminal of a radio communications network, the method comprising the following steps:

sending first messages on a first radio resource to a group of further terminals situated within a radio reception distance from the first terminal;

receiving at least one response, after sending the first messages, from at least one of the further terminals of the group, wherein the at least one response is a negative receipt acknowledgment, includes a resource indicator that uniquely identifies the first radio resource, and is formed based upon an effective transmission range of the first terminal, which is within the radio reception distance;

ascertaining a resource change decision as a function of the at least one response; and sending second messages, as a function of the resource change decision, on a second radio resource to the group of further terminals, the second radio resource being different from the first radio resource.

16. A second terminal of a radio communications network, the second terminal comprising:

at least one processor;

at least one memory with computer program code; and at least one communication module; and at least one antenna;

wherein:

the computer program code is configured in such a way that, using the at least one processor, the at least one communication module, and the at least one antenna, the computer program code causes the second terminal to:

receive a first message from a first terminal on a first radio resource due to being within a radio reception distance from the first terminal;

ascertain a response as a function of a successful or unsuccessful decoding of the first message, response being a negative receipt acknowledgment, including a resource indicator that uniquely identifies the first radio resource, and being formed based upon an effective transmission range of the first terminal, which is within the radio reception distance;

send the response to the first terminal; and receive a second message from the first terminal on a second radio resource, the second radio resource being different from the first radio resource.

17. The second terminal as recited in claim 16, wherein the second terminal is configured to:

ascertain a random number between two values;

compare the random number to a threshold value; and sends the response to the first terminal based on the comparison.

18. The second terminal as recited in claim 17, wherein the second terminal is configured to send the response to the first terminal only when the ascertained random number is less than or equal to the threshold value, the threshold value being a reciprocal value of a scaling factor.

19. The second terminal as recited in claim 18, wherein the second terminal is configured to:

receive, from terminals using a further message, (a) at least one piece of movement and/or (b) at least one piece of position information; and ascertain the scaling factor as a function of a number of the further terminals.

20. The second terminal as recited in claim 16, wherein the second terminal is configured to:

ascertain a reception power during the receipt of the first message; and ascertains the response as a function of the reception power and as a function of the successful or unsuccessful decoding of the first message.

21. The second terminal as recited in claim 16, wherein the first message and the second message include:

(a) Cooperative Awareness Messages (CAM) according to ETSI TS 102 637-2 V1.2.1 (2011-03); and/or (b) Decentralized Environmental Notification Messages (DENM) according to ETSI TS 102 637-3 V1.1.1 (2010-09).

22. A method for operating a second terminal of a radio communications network, the method comprising the following steps:

receiving a first message from a first terminal on a first radio resource due to being within a radio reception distance from the first terminal;

ascertaining a response as a function of a successful or unsuccessful decoding of the first message;

sending the response to the first terminal, wherein the response is a negative receipt acknowledgment, includes a resource indicator that uniquely identifies the first radio resource, and is formed based upon an effective transmission range of the first terminal, which is within the radio reception distance; and receiving a second message from the first terminal on a second radio resource, the second radio resource being different from the first radio resource.

* * * * *